(12) United States Patent
Kaneko et al.

(10) Patent No.: US 7,127,883 B1
(45) Date of Patent: Oct. 31, 2006

(54) EXHAUST GAS PURIFYING APPARATUS OF INTERNAL COMBUSTION ENGINE

(75) Inventors: Katsunori Kaneko, Okazaki (JP); Kazuo Koga, Okazaki (JP); Hiromitsu Ando, Okazaki (JP)

(73) Assignee: Mitsubishi Jidosha Kogoyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/188,190

(22) Filed: Nov. 10, 1998

(30) Foreign Application Priority Data

Nov. 10, 1997 (JP) ................................ 9-307374

(51) Int. Cl.
*F01N 3/00* (2006.01)

(52) U.S. Cl. ........................... 60/295; 60/277; 60/285; 60/297

(58) Field of Classification Search ................. 60/274, 60/285, 286, 295, 301, 302, 299, 276, 297, 60/277; 423/213.7
See application file for complete search history.

(56) References Cited

U.S. PATENT DOCUMENTS

| | | | | |
|---|---|---|---|---|
| 5,083,427 A | * | 1/1992 | Anderson | 60/285 |
| 5,159,810 A | * | 11/1992 | Grutter et al. | 60/285 |
| 5,201,802 A | * | 4/1993 | Hirota et al. | 60/277 |
| 5,325,666 A | * | 7/1994 | Rutschmann | 60/302 |
| 5,349,816 A | * | 9/1994 | Sanbayashi et al. | 60/301 |
| 5,402,641 A | * | 4/1995 | Katoh et al. | 60/285 |
| 5,448,887 A | * | 9/1995 | Takeshima | 60/285 |
| 5,472,673 A | * | 12/1995 | Goto et al. | 60/285 |
| 5,509,267 A | * | 4/1996 | Theis | 60/285 |
| 5,551,231 A | * | 9/1996 | Tanaka et al. | 60/301 |
| 5,600,949 A | * | 2/1997 | Kato et al. | 60/285 |
| 5,634,331 A | * | 6/1997 | Aoki et al. | 60/297 |
| 5,656,244 A | * | 8/1997 | Cole | 60/297 |
| 5,727,385 A | * | 3/1998 | Hepburn | 60/297 |
| 5,743,084 A | * | 4/1998 | Hepburn | 60/274 |
| 5,746,049 A | * | 5/1998 | Cullen et al. | 60/274 |
| 5,746,989 A | * | 5/1998 | Murachi et al. | 60/301 |
| 5,758,493 A | * | 6/1998 | Asik et al. | 60/274 |
| 5,771,685 A | * | 6/1998 | Hepburn | 60/274 |
| 5,850,735 A | * | 12/1998 | Araki et al. | 60/286 |
| 5,866,078 A | * | 2/1999 | Pfefferle et al. | 60/297 |
| 5,878,567 A | * | 3/1999 | Adamczyk, Jr. et al. | 60/301 |
| 5,937,638 A | * | 8/1999 | Akazaki et al. | 60/285 |
| 5,953,907 A | * | 9/1999 | Kato et al. | 60/276 |
| 5,970,707 A | * | 10/1999 | Sawada et al. | 60/285 |
| 5,974,788 A | * | 11/1999 | Hepburn et al. | 60/274 |

(Continued)

FOREIGN PATENT DOCUMENTS

JP 5187230 A 7/1993

(Continued)

*Primary Examiner*—Tu M. Nguyen
(74) *Attorney, Agent, or Firm*—Birch Stewart Kolasch & Birch, LLP

(57) ABSTRACT

An exhaust gas purifying apparatus of an internal combustion engine is provided which includes: exhaust gas purifying means, provided in an exhaust passage of the engine, for adsorbing $NO_x$ in an exhaust gas when the air-fuel ratio of the exhaust gas is lean. The exhaust gas apparatus releases or reduces the adsorbed $NO_x$ when the oxygen concentration of the exhaust gas is reduced. A light-off catalyst is provided upstream of the exhaust gas purifying apparatus in the exhaust passage, which has a lower $O_2$ storage capability than the exhaust gas purifying apparatus. There is a control device for controlling the air-fuel ratio of the exhaust gas so that an atmosphere having a reduced oxygen concentration is produced around the exhaust gas purifying apparatus when the $NO_x$ conversion efficiency of the exhaust gas purifying apparatus is decreased.

20 Claims, 8 Drawing Sheets

U.S. PATENT DOCUMENTS

| | | | |
|---|---|---|---|
| 6,044,644 A * | 4/2000 | Hu et al. | 60/302 |
| 6,082,101 A * | 7/2000 | Manaka et al. | 60/285 |
| 6,119,450 A * | 9/2000 | Boegner et al. | 60/276 |
| 6,182,443 B1 * | 2/2001 | Jarvis et al. | 60/299 |
| 6,185,929 B1 * | 2/2001 | Ishizuka et al. | 60/285 |
| 6,233,923 B1 * | 5/2001 | Itou et al. | 60/277 |
| 6,263,666 B1 * | 7/2001 | Kubo et al. | 60/277 |
| 6,341,487 B1 * | 1/2002 | Takahashi et al. | 60/286 |
| 6,418,711 B1 * | 7/2002 | Surnilla et al. | 60/277 |

FOREIGN PATENT DOCUMENTS

| | | |
|---|---|---|
| JP | 8294618 A | 11/1996 |

* cited by examiner

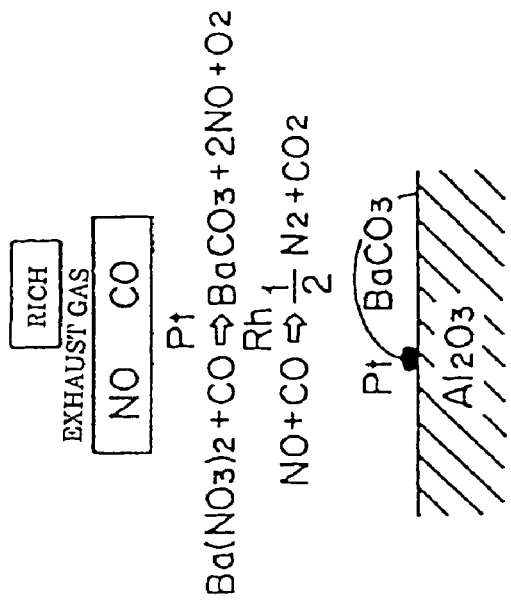
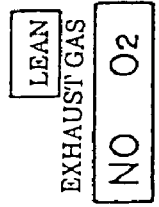
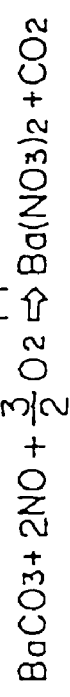
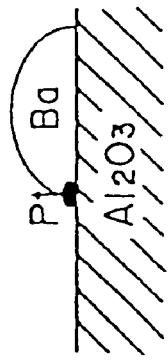
FIG. 3(a)      FIG. 3(b)      FIG. 3(c)

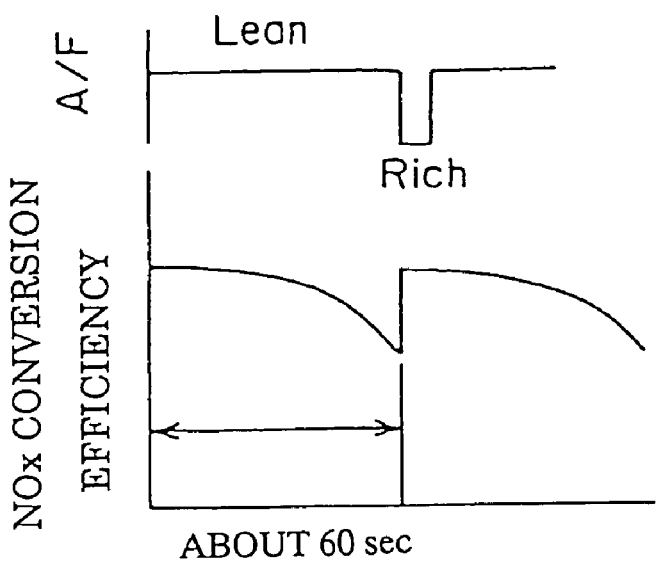
FIG. 6(a)
FIG. 6(b)
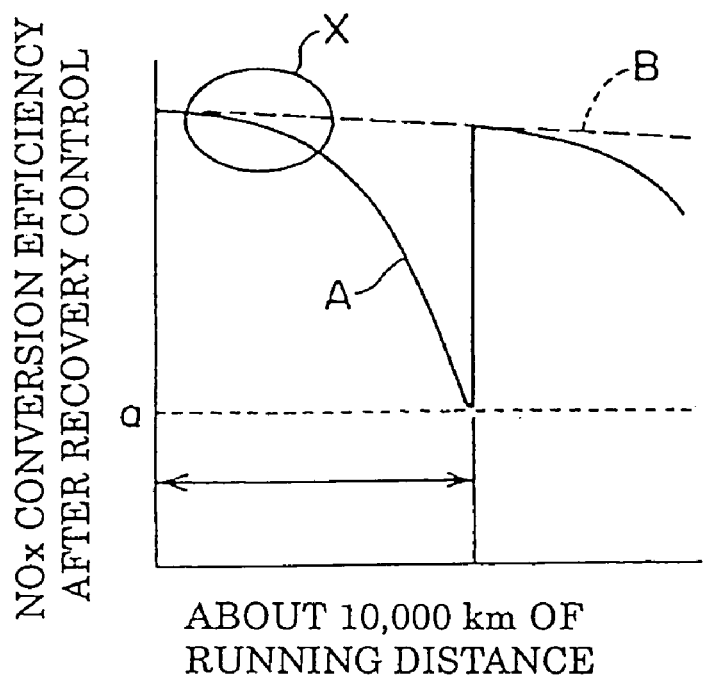
FIG. 7

EXHAUST GAS PURIFYING APPARATUS OF INTERNAL COMBUSTION ENGINE

FIELD OF THE INVENTION

The present invention relates to an exhaust gas purifying apparatus of an internal combustion engine, and in particular to such an exhaust gas purifying apparatus that is able to highly and efficiently reduce harmful components, particularly NOx (nitrogen oxides), contained in exhaust gases, for the internal combustion engine capable of operating with a fuel-lean air/fuel mixture.

BACKGROUND OF THE INVENTION

In recent years, internal combustion engines, capable of operating in a lean burn mode with a fuel-lean mixture, have been developed to achieve further improved fuel economy. In this type of internal combustion engine, it is difficult to reduce NOx in exhaust gases during the lean burn operation, by using a conventional three-way catalyst having a function of reducing CO, HC, and NOx in exhaust gases when the engine is operating at around the stoichiometric air/fuel ratio.

In view of the above problem, a new type of catalyst (called adsorption type lean NOx catalyst or trap-type lean NOx catalyst) has been developed which has a function of adsorbing NOx in exhaust gas under an oxygen excessive atmosphere (or oxidizing atmosphere), and releasing the adsorbed NOx when the oxygen concentration of the exhaust gas is reduced.

More specifically, the lean NOx serves to oxidize NOx in the exhaust gas to produce nitrates when it is surrounded by an atmosphere having a high oxygen concentration, thereby to adsorb NOx, and also serves to produce carbonates by causing reaction between the nitrates, adsorbed on the lean NOx catalyst, and CO in the exhaust gas when it is surrounded by a reducing atmosphere having a reduced oxygen concentration, thereby to release NOx. The NOx thus released from the lean NOx catalyst is then converted into a harmless substance due to the three-way function of the lean NOx catalyst, or by means of a three-way catalyst located downstream of the lean NOx catalyst.

While NOx in the exhaust gas can be surely reduced by the lean NOx catalyst during the lean burn operation, it is still difficult to sufficiently reduce HC in the exhaust gas when the engine starts operating in a cold state, for example, only by using the lean NOx catalyst as described above.

In order to reduce HC in the exhaust gas to a sufficiently low level upon start of the engine in a cold state, it has been proposed to provide a light-off catalyst (L/O catalyst, FCC: Front Catalytic Converter) immediately downstream of the engine and upstream of the conventional catalyst.

Examples of the light-off catalyst are disclosed in, for example, Japanese laid-open Patent Publication No. 8-294618 (first publication), and Japanese laid-open Patent Publication No. 5-187230 (second publication).

As disclosed in the above-identified first and second publications, the light-off catalyst consists of a three-way catalyst (TWC), and the three-way catalyst or oxidizing catalyst used as the light-off catalyst contains, for example, ceria ($CeO_2$) as an additive having a function of storing $O_2$.

While the engine operates in a stoichiometric feedback mode or a lean burn mode during normal running of the vehicle, it sometimes operates in a rich burn mode with a fuel-rich mixture when the vehicle is in a transient state, for example, when the vehicle is accelerating. In this case, since the amount of $O_2$ contained in the exhaust gas is not sufficient to oxidize HC and CO, $O_2$ stored in ceria ($CeO_2$) of the light-off catalyst is utilized for oxidizing HC and CO, thereby to reduce HC to a sufficiently low level even during the transient rich burn operation of the engine.

The use of both the lean NOx catalyst and the light-off catalyst as disclosed in the above first and second publications, however, suffers from a problem as follows: since the light-off catalyst has an $O_2$ storage function, CO that is needed for releasing adsorbed NOx from the lean NOx catalyst in a reducing atmosphere is undesirably oxidized by the light-off catalyst, and a sufficient amount of CO cannot be supplied to the lean NOx catalyst. Thus, the NOx adsorbed on the lean NOx catalyst may not be sufficiently released from the catalyst because of the oxidation of CO by the light-off catalyst.

In order to recover or resume the NOx conversion efficiency of the lean NOx catalyst to a nominal level, recovery control is performed to produce a rich atmosphere (of a small air-fuel ratio) having a reduced oxygen concentration around the lean NOx catalyst, thereby to release the adsorbed NOx from the lean NOx catalyst. As an example of the recovery control, an additional fuel is injected to the combustion chamber of the engine. Since CO supplied by the recovery control is oxidized and consumed by $O_2$ stored in the additive (for example, ceria $CeO_2$) of the light-off catalyst, NOx adsorbed on the lean NOx catalyst cannot be surely released from the catalyst, and the NOx conversion efficiency of the lean NOx catalyst cannot be resumed to the nominal level.

It may be considered to control the air-fuel ratio to be even richer in order to resume the NOx conversion efficiency of the lean NOx catalyst to the desired level, but this method results in deterioration of the fuel efficiency or fuel economy, and is therefore undesirable.

In the meantime, a sulfur component (S component) is contained in the fuel and lubricating oil, and such a sulfur component is also contained in exhaust gas. The lean NOx catalyst, therefore, serves to adsorb the sulfur component as well as NOx in a high oxygen concentration atmosphere. Namely, the sulfur component contained in the fuel or lubricating oil is burned in the combustion chamber, and then oxidized on the surface of the lean NOx catalyst, to provide $SO_3$. A part of the $SO_3$ then reacts with an adsorbent for adsorbing NOx on the lean NOx catalyst, to produce sulfates that are adsorbed on the lean NOx catalyst.

While the nitrates and sulfates as described above are adsorbed on the lean NOx catalyst, the amount of sulfates remaining on the lean NOx catalyst increases with time, since the sulfates have higher stability in the form of salts than nitrates, and only a part of the sulfates dissolves in an atmosphere having a reduced oxygen concentration. With an increase in the remaining amount of sulfates, the ability of the lean NOx catalyst to adsorb NOx deteriorates with time, and the purifying efficiency (NOx conversion efficiency) of the lean NOx catalyst is decreased. This is called S poisoning.

When the lean NOx catalyst suffers from the S poisoning as described above, it becomes necessary to release the sulfur component (SOx) from the lean NOx catalyst. Where both of the lean NOx catalyst and the light-off catalyst, as disclosed in the above first and second publications, are used, however, SOx adsorbed on the lean NOx catalyst cannot be sufficiently released since the light-off catalyst has a high $O_2$ storage ability.

To regenerate the lean NOx catalyst by producing an atmosphere having a reduced oxygen concentration around the lean NOx catalyst, and releasing SOx adsorbed on the lean NOx catalyst in the reducing atmosphere, regeneration control is performed by, for example, controlling the air-fuel ratio to be richer, to reduce the oxygen concentration of the exhaust gas. Since CO supplied under the regeneration control for releasing SOx reacts with $O_2$ stored in an additive (for example, ceria $CeO_2$) of the light-off catalyst, to be oxidized and consumed by the $O_2$, the SOx adsorbed on the lean NOx catalyst cannot be released from the catalyst, and the lean NOx catalyst cannot be regenerated as desired.

Also, $SO_2$ emitted from the engine reacts with $O_2$ stored in the additive of the light-off catalyst, to produce $SO_3$ ($2SO_2+O_2=2SO_3$), and therefore the sulfur component is likely to be adsorbed on the lean NOx catalyst located downstream of the light-off catalyst. Thus, the lean NOx catalyst is more likely to suffer from S poisoning due to the oxidizing function of the light-off catalyst.

SUMMARY OF THE INVENTION

It is therefore an object of the present invention to provide an exhaust gas purifying apparatus of an internal combustion engine that is able to positively reduce HC in exhaust gas upon start of the engine in a cold state, and is also able to positively release NOx and SOx from a NOx catalyst when the NOx conversion efficiency is decreased due to adsorption of the NOx or SOx on the NOx catalyst, without decreasing the fuel efficiency, thus assuring improved durability of the NOx catalyst.

To accomplish the above object, the present invention provides an exhaust gas purifying apparatus of an internal combustion engine wherein exhaust gas purifying means is provided in an exhaust passage of the engine, for adsorbing NOx in exhaust gas when the air-fuel ratio of the exhaust gas is lean, and releasing or reducing the adsorbed NOx when the oxygen concentration of the exhaust gas is reduced. Also, a light-off catalyst having a lower $O_2$ storage ability than the exhaust gas purifying means is provided upstream of the exhaust gas purifying means in the exhaust passage. Further, the air-fuel ratio of the exhaust gas is controlled so that an atmosphere having a reduced oxygen concentration is produced around the exhaust gas purifying means when a NOx conversion efficiency of the exhaust gas purifying means is decreased.

In the exhaust gas purifying apparatus as described above, when the NOx conversion efficiency is decreased due to adsorption of NOx or SOx on the exhaust gas purifying means, an additional fuel is injected into the combustion chamber of the engine, for example, to supply CO to the exhaust gas purifying means and produce an atmosphere having a reduced oxygen concentration around the exhaust gas purifying means. In this case, the CO supplied in this manner is prevented from being oxidized by the light-off catalyst, thus avoiding a reduction in the amount of CO supplied to the exhaust gas purifying means. Thus, NOx and SOx can be positively released from the exhaust gas purifying means, without decreasing the fuel efficiency, and the durability of the exhaust gas purifying means can be enhanced.

In a preferred form of the present invention, the exhaust gas purifying means includes an NOx catalyst that adsorbs NOx in the exhaust gas when the air-fuel ratio of the exhaust gas is lean, and releases or reduces the adsorbed NOx when the oxygen concentration of the exhaust gas is reduced. The exhaust gas purifying means further includes a three-way catalyst provided downstream of the NOx catalyst in the exhaust passage, for reducing harmful components in the exhaust gas when the air-fuel ratio of the exhaust gas is in a neighborhood of the stoichiometric ratio.

The exhaust gas purifying means may consist of a single catalyst having the function of the NOx catalyst and the function of the three-way catalyst as described above.

The light-off catalyst may consist of a single catalyst that functions as a three-way catalyst, and also functions as a SOx catalyst that adsorbs SOx when the air-fuel ratio of the exhaust gas is lean, and releases the adsorbed SOx when the exhaust air/fuel ratio is rich.

The light-off catalyst is preferably constructed such that the amount of oxygen adsorbed on the catalyst is not greater than about 150 cc per one-liter volume of the catalyst when measured according to an oxygen pulse method. Thus, the $O_2$ storage ability of the light-off catalyst is decreased.

Also, the light-off catalyst is preferably constructed so that an oxygen component stored in the catalyst is not greater than about 25 g per one-liter volume of the catalyst. Thus, the $O_2$ storage ability of the light-off catalyst is advantageously decreased.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 3(a) through FIG. 3(c) are schematic views useful in explaining the principle of NOx conversion of a lean NOx catalyst of the exhaust gas purifying apparatus of FIG. 1 in the lean burn internal combustion engine, wherein FIG. 3(a) shows the structure of the lean NOx catalyst, FIG. 3(b) shows the NOx adsorbing function of the lean NOx catalyst, and FIG. 3(c) shows the NOx releasing function of the lean NOx catalyst;

FIG. 4(a) and FIG. 4(b) are schematic views useful in explaining the functions of the lean NOx catalyst for adsorbing and releasing a sulfur component in the lean burn internal combustion engine, wherein FIG. 4(a) shows the function of adsorbing the sulfur component, and FIG. 4(b) shows the function of releasing the sulfur component;

FIG. 6(a) and FIG. 6(b) are graphs useful in explaining recovery control (rich pulse) performed in the exhaust gas purifying apparatus of the embodiment of FIG. 1, wherein FIG. 6(a) shows the air-fuel ratio of exhaust gas, and FIG. 6(b) shows the NOx conversion efficiency of the lean NOx catalyst;

FIG. 7 is a graph useful in explaining regeneration control performed in the exhaust gas purifying apparatus of the internal combustion engine according to the embodiment of FIG. 1;

DETAILED DESCRIPTION OF THE PREFERRED EMBODIMENT(S)

Referring to FIG. 1 through FIG. 8, an exhaust gas purifying apparatus of an internal combustion engine according to one embodiment of the present invention will be described in detail.

Figure 1:
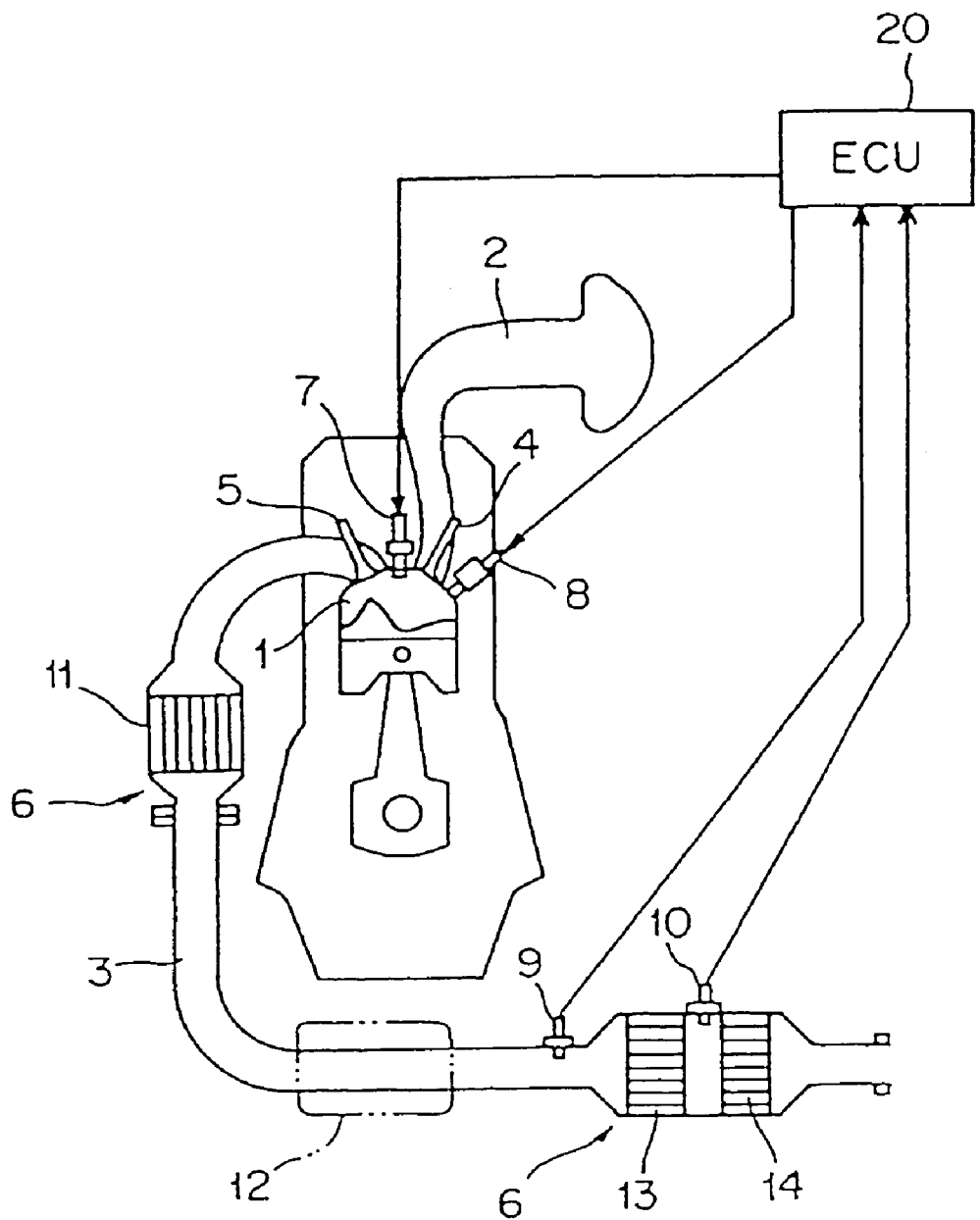
FIG. 1 is a schematic view showing the whole construction of an exhaust gas purifying apparatus of an internal combustion engine according to one embodiment of the present invention.

Initially, the internal combustion engine equipped with the exhaust gas purifying apparatus of the present embodiment will be described. The internal combustion engine, which is constructed as shown in FIG. 1, is a spark ignition type four-cycle engine that operates on the four-stroke cycle consisting of suction stroke, compression stroke, combustion/expansion stroke, and exhaust stroke. Also, the internal combustion engine of the present embodiment is constructed as an in-cylinder injection type engine in which the fuel is directly injected into a combustion chamber 1.

An intake passage 2 and an exhaust passage 3 are connected to the combustion chamber 1 so that these passages 2, 3 may be in fluid communication with the chamber 1. Also, an intake valve 4 is provided for controlling fluid communication between the intake passage 2 and the combustion chamber 1, and an exhaust valve 5 is provided for controlling fluid communication between the exhaust passage 3 and the combustion chamber 1.

An air cleaner and a throttle valve (not shown) are provided in the intake passage 2, and an exhaust purifying apparatus 6 and a muffler (not shown) are provided in the exhaust passage 3. The exhaust gas purifying apparatus 6 will be described later in detail.

An injector (fuel injection valve) 8 is located in the engine with its opening being exposed to the combustion chamber 1 in a cylinder of the engine, and serves to directly inject a fuel into the combustion chamber 1. Naturally, the injector 8 is installed in each cylinder of the engine. In the present embodiment, in which the engine is in the form of an in-line four-cylinder engine, for example, four injectors 8 are installed in the respective cylinders.

In the engine constructed as described above, intake air that has passed through the air cleaner enters the combustion chamber 1 through the intake valve 4 placed in the open position, such that the amount of the intake air is controlled by the opening of the throttle valve (not shown). The intake air thus sucked into the combustion chamber 1 is then mixed with fuel that is directly injected by the injector 8 based on a signal from an electronic control unit (ECU) 20 as control means. The mixture of the intake air and the fuel is burned in the combustion chamber 1 upon ignition of an ignition plug 7 at an appropriate timing, to generate engine torque, and exhaust gases are emitted from the combustion chamber 1 into the exhaust passage 3. The exhaust gases are then passed through the exhaust gas purifying apparatus 6 for reducing three harmful components, CO, HC, NOx, contained in the gases, and then passed through the muffler for reducing noise, to be released into the atmosphere.

The engine is provided with various sensors, and detection signals from the sensors are transmitted to the ECU 20. For example, an NOx sensor 9 (that will be called "upstream NOx sensor") is located upstream of the exhaust gas purifying apparatus 6 in the exhaust passage 3, and another NOx sensor 10 (that will be called "downstream NOx sensor") is located downstream of a lean NOx catalyst 13 (that will be described later) in the exhaust passage 3. The NOx conversion efficiency of the exhaust purifying apparatus 6 can be computed based on detected information from the upstream NOx sensor 9 and downstream NOx sensor 10. The calculation of the NOx conversion efficiency will be described later.

More specifically, the engine is constructed so that the intake air flowing from the intake passage 2 into the combustion chamber 1 forms a vertical swirl (reverse tumble flow), and the vertical swirl thus formed in the combustion chamber 1 is utilized to concentrate a small amount of the fuel in the vicinity of the ignition plug 7 located at the top, central part of the combustion chamber 1. As a result, an extremely lean air-fuel ratio is established in a chamber portion remote from the ignition plug 7, while the stoichiometric air-fuel ratio or rich air-fuel ratio is established only in the vicinity of the ignition plug 7. In this manner, stable stratified charge combustion (stratified, extreme-lean burn) can be realized in the combustion chamber 1, assuring significantly reduced fuel consumption. In this case, the optimum fuel injection timing is in the later period of the compression stroke in which weak air flow prevents the fuel from dissipating too far by the time of ignition.

When the engine is desired to produce large output, the fuel from the injector 8 is introduced uniformly into the entire volume of the combustion chamber 1, and mixed in advance with the air to provide an air/fuel mixture having the stoichiometric air-fuel ratio or lean air/fuel ratio in the entire combustion chamber 1. While the larger output can be achieved by using the stoichiometric air/fuel mixture, rather than the lean mixture, the engine is able to produce a large output with high efficiency in both cases, by injecting the fuel in such timing that ensures sufficient atomization and vaporization of the fuel. In this case, the optimum fuel injection timing is determined to complete the fuel injection during the intake stroke, so that the intake air can be utilized for encouraging atomization and vaporization of the fuel.

The engine of the present embodiment operates in a selected one of four fuel combustion modes, i.e., an extreme lean burn mode (compression lean burn mode), a lean burn mode (intake lean burn mode), a stoichiometric operation mode (stoichiometric feedback operation mode), and a rich burn mode (open loop mode). In the extreme lean burn mode, the engine operates with an extremely lean air/fuel mixture (whose air-fuel ratio is considerably greater than the stoichiometric ratio), utilizing stratified charge combustion resulting from fuel injection during the compression stroke. In the intake lean burn mode, the engine operates with a relatively lean air/fuel mixture whose air/fuel ratio is greater than the stoichiometric ratio, but not as much as that of the air/fuel mixture used in the extreme lean burn mode as described above. In the stoichiometric operation mode, feedback control is performed based on information from an $O_2$ sensor and others, so that the air/fuel ratio of the mixture becomes approximately equal to the stoichiometric ratio. In the rich burn mode (open loop mode), the engine operates with a fuel-rich air/fuel mixture (whose air-fuel ratio is less than the stoichiometric ratio).

The operation of the engine is controlled by selecting one mode from various operation modes as described above. The operation mode is selected based on The engine speed Ne and the effective pressure Pe that represents a load condition of the vehicle. Namely, the compression lean burn mode (compression-L) is selected when the engine speed Ne is low, and the load Pe is small. As the engine speed Ne and the load Pe increase, the intake lean burn mode (intake-L), stoichiometric feedback operation mode (S/F), and the open loop mode (O/L) are selected in this order. The selection and setting of the operation mode will be further described later.

The exhaust gas purifying apparatus 6 according to the present embodiment will be now explained.

The exhaust gas purifying apparatus 6 includes a light-off catalyst (L/O catalyst, FCC) 11, a lean NOx catalyst (NOx catalyst, NOx-TRAP) 13, and a three-way catalyst (TWC) 14, as shown in FIG. 1. The lean NOx catalyst 13 and the three-way catalyst 14 constitute exhaust gas purifying means.

The light-off catalyst 11 includes a three-way catalyst having a function of reducing CO, HC, and NOx contained in the exhaust gas. The light-off catalyst 11 is located in the exhaust passage 3 immediately downstream of the combustion chamber 1 of the engine, so that the catalyst 11 reaches its activation temperature due to exposure to high-temperature exhaust gas immediately after the engine starts operating in a cold state. In particular, the light-off catalyst 11 serves to reduce HC in the exhaust gas upon the start of the engine in the cold state. The light-off catalyst 11 is located upstream of the lean NOx catalyst 13 in the exhaust passage 3.

The $O_2$ storage capability of the light-off catalyst 11 is set to be lower than that of the three-way catalyst 14. More specifically, the $O_2$ storage capability of the light-off catalyst 11 is determined so that the amount of adsorption of oxygen per liter of catalyst volume is not greater than about 150 cc (namely, the oxygen adsorption amount is 150 cc/liter), when measured according to an oxygen pulse method.

An apparatus and a method for measuring the $O_2$ storage ability according to a conventional oxygen pulse method will be now described.

Figure 9:
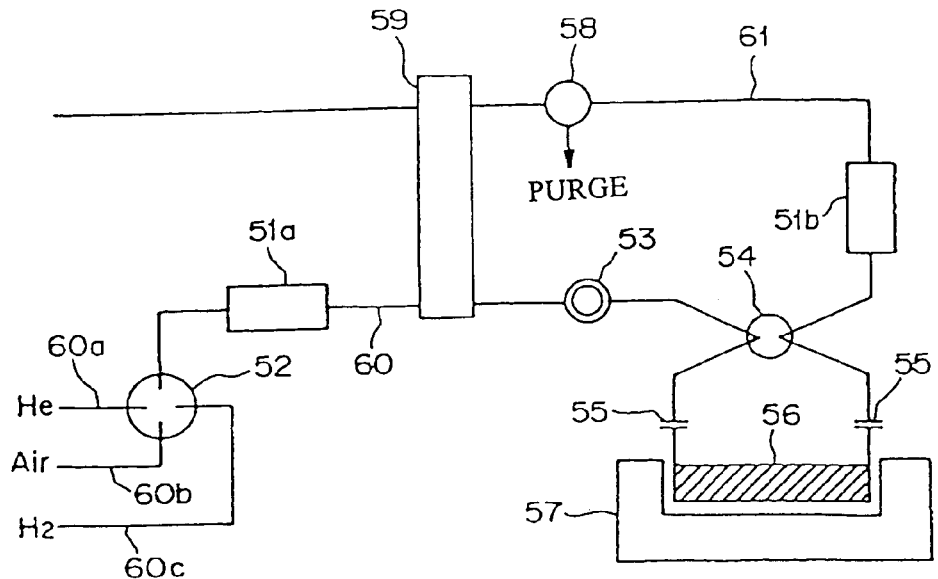
FIG. 9 is a view showing the whole construction of a measurement device for measuring an $O_2$ storage ability according to a conventional oxygen pulse method.

As shown in FIG. 9, the apparatus for measuring the $O_2$ storage ability by the oxygen pulse method includes a test tube 56 containing a specimen (in this example, a light-off catalyst containing ceria $CeO_2$), a supply passage 60 through which a gas (He, air, or $H_2$) is supplied to the specimen in the test tube 56, a discharge passage 61 through which the gas is discharged from the test tube 56, and a furnace 57 that heats the test tube 56 to a certain temperature.

The supply passage 60 is connected at its upstream end to a He conduit 60a, an air conduit 60b, and a $H_2$ conduit 60c, via a switch cock 52, and connected at its downstream end to the test tube 56 via a connector 55. By operating the switch cock 52 to an appropriate position, a desired one of He, air, and $H_2$ can be introduced into the supply passage 60, to be supplied to the specimen in the test tube 56.

In the supply passage 60 between the switch cock 52 and the test tube 56, a flow meter 51a and an oxygen pulse injector 53 are provided in this order as viewed from the upstream side of the passage 60. The flow meter 51a serves to detect the flow rate of the gas flowing through the supply passage 60. The oxygen pulse injector 53 is adapted to introduce oxygen in pulse form into the supply passage 60 for measurement of the $O_2$ storage ability.

A flow path switch cock 54 is provided for connecting the supply passage 60 and the discharge passage 61. The flow path switch cock 54 can be selectively placed in a first position, in which the gas flowing through the supply passage 60 is supplied to the specimen in the test tube 56 upon measurement of the $O_2$ storage ability, and a second position, in which the gas in the supply passage 60 flows into the discharge passage 61 while bypassing the test tube 56.

In the discharge passage 61 on the downstream side of the flow switch cock 54, a flow meter 51b and a purge cock 58 are located in this order as viewed from the upstream side of the passage 61. The flow meter 51b serves to detect the flow rate of the gas flowing through the discharge passage 61. The purge cock 58 serves to discharge or release unnecessary gas into the atmosphere during a preliminary process before the measurement of the $O_2$ storage ability. In addition, a thermal conductivity detector 59 is provided for detecting the thermal conductivity of the gas that has passed through the test tube 56.

Next, the method of measuring the $O_2$ storage ability by the oxygen pulse method, using the above measurement apparatus, will be described.

Before the measurement of the $O_2$ storage ability is initiated, a preliminary process is conducted to remove oxygen that has already been adsorbed on the specimen.

In this preliminary process, the specimen is introduced into the test tube 56, which is then connected, via connectors 55, to the main body (more specifically, supply passage 60 and discharge passage 61) of the measurement apparatus, and the furnace 57 is set in position. Then, the switch cock 52 is switched to a position for communicating the supply passage 60 with the $H_2$ conduit 60c, so that $H_2$ is supplied to the test tube 56 through the supply passage 60, and the specimen is maintained in this state for 30 minutes while being kept at about 450° C.

In this case, the flow rate of the gas introduced into the test tube 56 is controlled to a certain value by means of the flow meter 51a. Also, the purge cock 58 is placed in the open position, so that the gas flowing into the discharge passage 61 is released into the atmosphere.

In the process as described above, oxygen that is adsorbed on the specimen is caused to react with $H_2$, and released from the specimen, to establish a desired condition in which no oxygen is adsorbed on the specimen.

Subsequently, the switch cock 52 is operated to a position for communicating the supply passage 60 with the He conduit 60a, so that He is supplied to the test tube 56 through the supply passage 60, and the specimen is maintained in this state for 30 min., while being cooled down to room temperature. The supplied He is adapted to remove $H_2$ that has been supplied in the above process for releasing oxygen from the specimen.

By conducting the preliminary process as described above, the $O_2$ storage ability of the specimen can be measured with improved accuracy.

After the preliminary process is completed, the $O_2$ storage ability is actually measured in the following manner.

To measure the $O_2$ storage ability, oxygen pulses are introduced from the oxygen pulse injector 53 into the supply passage 60, so that oxygen is supplied to the specimen in the test tube 56.

After the adsorption of oxygen onto the specimen reaches a steady state (in which the specimen is supposed to be saturated with oxygen), oxygen pulses are introduced from the oxygen pulse injector 53 for a certain number of times (for example, twice), to be supplied to the specimen in the test tube 56, and the supply of the oxygen is finished.

During the measurement of the $O_2$ storage ability, the gas is inhibited from being introduced from the switch cock 52, and the purge cock 58 is held in the closed state. Each time an oxygen pulse is supplied from the oxygen pulse injector 53 into the supply passage 60, the thermal conductivity is detected by the thermal conductivity detector 59.

Also, calibration of the oxygen amount is conducted by operating the flow path switch cock 54 to the position for bypassing the test tube 56. In the calibration of the oxygen amount, the relationship between the amount of oxygen supplied in pulse form from the oxygen pulse injector 53, and an area of a peak value detected by the thermal conductivity detector 59 with respect to this amount of oxygen is obtained.

Based on the relationship between the oxygen amount and the area of the peak value obtained through the calibration of the oxygen amount, an amount of oxygen adsorbed on the specimen is calculated from a difference between the average value of the areas of peak values detected by the thermal conductivity detector 59 after the specimen reaches the steady state, and the area of the peak value detected by the thermal conductivity detector 59 each time the oxygen is supplied from the oxygen pulse injector 53 before the specimen reaches the steady state, and the oxygen adsorption amount (cc/liter) per liter of the specimen, namely, the $O_2$ storage ability, can be calculated from the sum of the oxygen adsorption amounts.

The $O_2$ storage ability of the light-off catalyst 11 is set to be equal to or less than about 150 cc/liter (when measured according to the oxygen pulse method), which is less than the $O_2$ storage ability (200 to 500 cc/liter when measured according to the oxygen pulse method) of generally used underfloor catalysts (for example, exhaust gas purifying means including the lean NOx catalyst 13 and the three-way catalyst 14), for the reason as described below with reference to FIG. 10.

Figure 10:
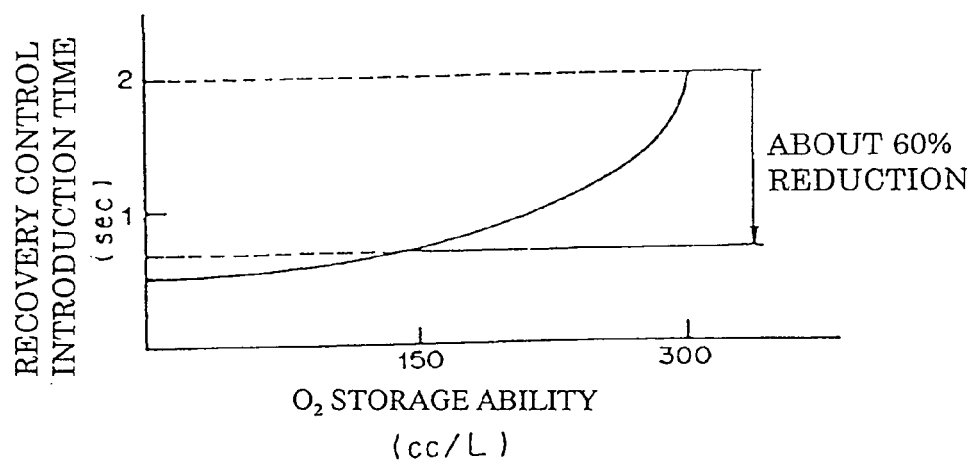
FIG. 10 is a graph showing an effect of the exhaust gas purifying apparatus of the internal combustion engine according to the embodiment of FIG. 1.

FIG. 10 shows a result of an experiment on the introduction time of recovery control, namely, a period of time in which the recovery control is performed, when the $O_2$ storage ability of the light-off catalyst 11 measured by the oxygen pulse method is varied.

The exhaust gas purifying apparatus used in this experiment is constructed such that the light-off catalyst 11 having a volume of about 0.7 liters is provided on the upstream side of the exhaust gas purifying means including the lean NOx catalyst 13 having a volume of about 1.3 liters and the three-way catalyst 14 having a volume of about 1.0 liter. In the experiment, the engine was kept operating for about 60 seconds in the lean burn mode, with the air-fuel ratio (A/F ratio) being controlled to about 30, and the recovery control introduction time required for completely release NOx adsorbed on the lean NOx catalyst 13 was measured.

As is understood from the result of the experiment shown in FIG. 10, the recovery control introduction time is relatively short when the $O_2$ storage ability of the light-off catalyst 11 measured by the oxygen pulse method is equal to or less than about 150 cc/liter. If the $O_2$ storage ability of the light-off catalyst 11 becomes greater than about 150 cc/liter, however, the recovery control introduction time is rapidly increased.

Thus, if the $O_2$ storage capability of the light-off catalyst 11 is controlled to be equal to or less than about 150 cc/liter, the recovery control introduction time is reduced, and therefore the $O_2$ storage capability of the light-off catalyst 11 is considered as being low enough to prevent HC or CO, for example, from being oxidized by the catalyst 11.

For example, the rate of fuel consumption of the engine is reduced by about 60% when using the exhaust gas purifying apparatus including the light-off catalyst 11 having about 150 cc/liter of $O_2$ storage ability measured according to the oxygen pulse method, as compared with the case where the light-off catalyst 11 has about 300 cc/liter of $O_2$ storage ability as measured by the oxygen pulse method. In view of the reduction in the rate of the fuel consumption, therefore, it is desirable to control the $O_2$ storage ability of the light-off catalyst 11 to be equal to or less than about 150 cc/liter.

In view of regeneration control for releasing a sulfur component from the lean NOx catalyst 13, it is also desirable to control the $O_2$ storage ability of the light-off catalyst 11 to be equal to or less than 150 cc/liter, as in the case of the recovery control for the lean NOx catalyst 13.

In the present embodiment, therefore, an amount of an additive, such as ceria ($CeO_2$), contained in the light-off catalyst 11 and having an $O_2$ storage function is controlled to be not greater than 25 g per one-liter volume of the light-off catalyst 11 (25 g/liter or less), or may be zero, so that the amount of oxygen that can be stored in the light-off catalyst becomes less than 150 cc per one-liter volume of the light-off catalyst 11 (namely, the oxygen amount is less than 150 cc/liter). Thus, the $O_2$ storage ability of the light-off catalyst 11 measured by the above-described oxygen pulse method is decreased.

Figure 2A:
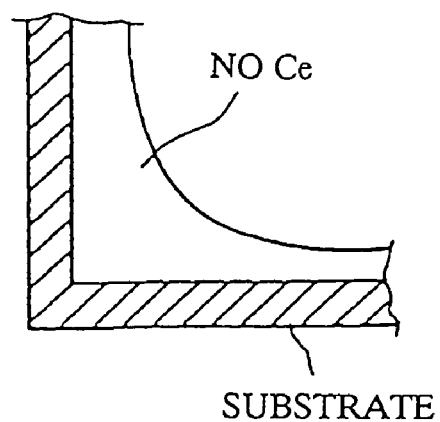
FIG. 2(a) is a schematic view showing a light-off catalyst of the exhaust gas purifying apparatus of the embodiment of FIG. 1, wherein the light-off catalyst has a single-layer structure.
Figure 2B:
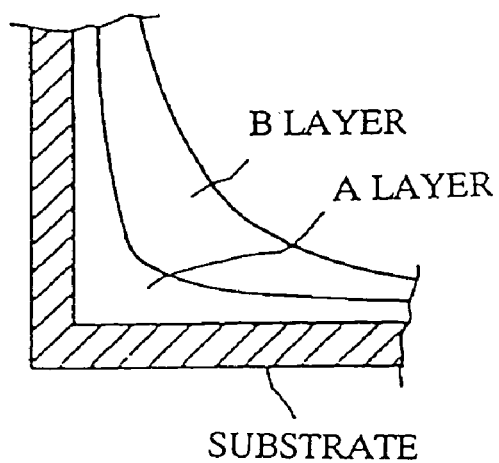
FIG. 2(b) is a schematic view showing a light-off catalyst of the exhaust gas purifying apparatus of the embodiment of FIG. 1, wherein the light-off catalyst has a multi-layer structure.

To decrease the $O_2$ storage ability of the light-off catalyst 11, the amount of ceria ($CeO_2$) added to the light-off catalyst 11 is reduced, or absolutely no ceria ($CeO_2$) is added to the light-off catalyst 11, as shown in FIG. 2(*a*). Where the light-off catalyst 11 has a multi-layer structure as shown in FIG. 2(*b*) in which a two-layer structure consisting of A layer and B layer is illustrated by way of example, a part of the layers (for example, only A layer or B layer) may contain no ceria ($CeO_2$) at all.

By reducing the content of ceria ($CeO_2$) in the light-off catalyst 11 in the above manner, the light-off catalyst 11 is prevented from oxidizing HC or CO that is supplied to the lean NOx catalyst 13 during the recovery control or regeneration control, and therefore, NOx or SOx that has been adsorbed on the lean NOx catalyst 13 can be surely released from the catalyst 13 without incurring reduction in the fuel economy, thus assuring improved durability of the lean NOx catalyst 13.

Where the content of ceria ($CeO_2$) in the light-off catalyst 11 is reduced as described above, the air-fuel ratio needs to be more accurately controlled so that HC or CO will not be emitted during a rich burn operation of the engine when it starts operating in a cold state.

With the content of ceria ($CeO_2$) in the light catalyst 11 reduced as described above, HC or CO to be supplied to the lean NOx catalyst under the recovery control or regeneration control as described later is prevented from being oxidized and consumed by $O_2$ stored in the ceria ($CeO_2$) of the light-off catalyst 11.

The three-way catalyst 14 is located on the downstream side (underfloor side) of the exhaust passage 3, and serves to reduce CO, HC, and NOx contained in the exhaust gas particularly after the engine has warmed up.

The three-way catalyst 14 has a function of reducing CO, HC, and NOx in the exhaust gas while the engine is operating in the stoichiometric feedback operating mode, and also has a function of oxidizing CO and HC while the engine is operating in the lean burn mode.

Since the light-off catalyst 11 contains no ceria ($CeO_2$) or a reduced amount of ceria ($CeO_2$), the $O_2$ storage ability of the catalyst 11 is decreased, and the efficiency of reducing HC in the exhaust gas may deteriorate. In the present embodiment, therefore, ceria ($CeO_2$) having the $O_2$ storage function is added to the three-way catalyst 14, to improve the efficiency of reducing HC in the exhaust gas.

In the meantime, SOx released from the lean NOx catalyst under the regeneration control, as described later, reacts with HC existing around the catalyst, to be converted into a harmful substance, namely, $H_2S$. Due to the improved $O_2$ storage ability of the three-way catalyst 14 as described above, the $H_2S$ is oxidized by $O_2$ stored in the three-way catalyst 14, and the amount of $H_2S$ released from the catalyst 14 can be thus advantageously reduced.

The lean NOx catalyst 6A is located upstream of the three-way catalyst 14 in the exhaust passage 3 (underfloor-side exhaust passage 3), and is capable of sufficiently reducing or converting NOx in the exhaust gas even while the engine is operating in a lean burn mode with a large air-fuel ratio for the sake of improved fuel economy.

The lean NOx catalyst 13 may be an adsorption-type or trapping type lean NOx catalyst, which purifies the exhaust gas by adsorbing NOx on the catalyst and thus reducing NOx. As shown in FIG. 3(a), for example, the lean NOx catalyst 13 includes an alumina ($Al_2O_3$) substrate or support, and a metal component M, such as barium (Ba), as an adsorbent, and platinum (Pt) as an active metal, which are both carried on or supported by the substrate.

The metal component M supported by the lean NOx catalyst 13 functions to adsorb NOx contained in the exhaust gas under an oxygen excessive atmosphere, and release the adsorbed NOx when the oxygen concentration is reduced. The metal component M may include at least one of barium (Ba), sodium (Na), and potassium (K), for example.

The lean NOx catalyst 13 uses alumina $Al_2O_3$ for forming the substrate, zirconium oxide or zirconia ($ZrO_2$), or the like, may also be used. The lean NOx catalyst 13 may be constructed to provide a three-way catalytic function.

The NOx adsorbing and releasing functions of the lean NOx catalyst 13 constructed as described above will be now explained.

In an oxygen excessive atmosphere (lean atmosphere), $O_2$ is initially adsorbed onto the surface of platinum (Pt), and NO in the exhaust gas reacts with $O_2$ on the surface of the platinum (Pt), to produce $NO_2$ ($2NO+O_2=2NO_2$), as shown in FIG. 3(b).

In the meantime, a part of barium (Ba), as an adsorbent supported by the lean NOx catalyst 13, reacts with $O_2$, to provide barium oxide BaO on the surface of the catalyst 13, and the barium oxide BaO further reacts with CO, or the like, in the exhaust gas, to thus produce barium carbonate $BaCO_3$.

In this condition, a part of $NO_2$ formed from NO further reacts, on the platinum (Pt), with the barium oxide BaO and the barium carbonate $BaCO_3$ produced using CO, to produce barium nitrate $Ba(NO_3)_2$, which is then adsorbed on the lean NOx catalyst 13.

The above-described reaction is represented by the following formula (1):

$$BaCO_3+2NO+\tfrac{3}{2}O_2=Ba(NO_3)_2+CO_2 \quad (1)$$

In an atmosphere (rich atmosphere) in which the oxygen concentration is reduced, on the other hand, the amount of $NO_2$ produced is reduced, and the reaction in the reverse direction takes place, so that $NO_2$ is released from the lean NOx catalyst 13, as shown in FIG. 3(c).

Namely, the barium nitrate $Ba(NO_3)_2$ adsorbed on the lean NOx catalyst 13 reacts with CO in the exhaust gas on the surface of platinum Pt, to produce $NO_2$ and barium carbonate $BaCO_3$, and $NO_2$ thus produced is released from the lean NOx catalyst 13. This reaction is represented by the following formula (2):

$$Ba(NO_3)_2+CO=BaCO_3+2NO+O_2 \quad (2)$$

where $2NO+O_2=2NO_2$ (through part of NO is released as it is.)

Then, the released $NO_2$ is reduced by unburned HC, $H_2$, and CO contained in the exhaust gas, and discharged as $N_2$, as expressed by ($NO+CO=\tfrac{1}{2}N_2+CO$, $NO+H_2=\tfrac{1}{2}N_2+H_2O$).

As is understood from the above description, barium nitrate $Ba(NO_3)_2$ and barium carbonate $BaCO_3$ are present in chemical equilibrium on the lean NOx catalyst 13, and the reaction in each direction occurs depending upon the atmosphere surrounding the lean NOx catalyst 13.

The lean NOx catalyst 13 also functions to adsorb SOx in the exhaust gas in the presence of an oxygen excessive atmosphere, and release part of the adsorbed SOx in a certain high-temperature atmosphere when the oxygen concentration is reduced.

Figure 4A:
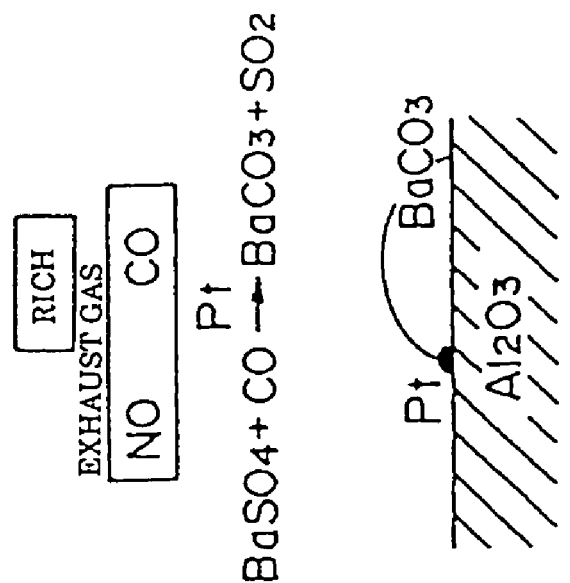

Namely, in the lean NOx catalyst 13, $O_2$ is adsorbed on the surface of platinum (Pt) in an oxygen excessive atmosphere (lean atmosphere), and $SO_2$ in the exhaust gas reacts with $O_2$ on the surface of the platinum Pt to produce $SO_3$ ($2SO_2+O_2=2SO_3$), as shown in FIG. 4(a). The $SO_2$ is discharged as a result of combustion of sulfur components contained in the fuel or lubricating oil.

Then, a part of $SO_3$ thus produced reacts with barium carbonate $BaCO_3$, using platinum (Pt) as a catalyst to produce barium sulfate $BaSO_4$, which is then adsorbed onto the lean NOx catalyst 13. This reaction is represented by the following chemical formula:

$$BaCO_3+SO_3=BaSO_4+CO_2 \quad (3)$$

Figure 4B:
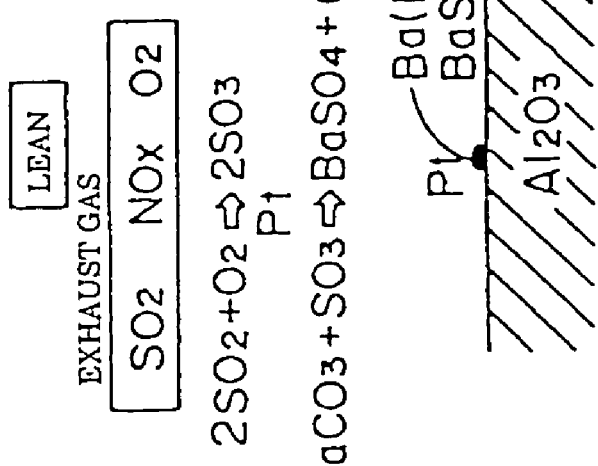

In an atmosphere (rich atmosphere), in which the oxygen concentration is reduced, on the other hand, a part of barium sulfate $BaSO_4$ adsorbed on the lean NOx catalyst 13 reacts with CO in the exhaust gas, due to the catalytic function of platinum Pt, to produce barium carbonate $BaCO_3$ and $SO_2$, as shown in FIG. 4(b), and $SO_2$ is released from the lean NOx catalyst 13. This reaction is represented by the following chemical formula (4):

$$BaSO_4+CO=BaCO_3+SO_2 \quad (4)$$

In order to reduce NOx by using the NOx adsorbing and releasing function, the lean NOx catalyst 13 needs to release NOx once a certain amount of NOx is adsorbed thereon.

On the lean NOx catalyst 13, barium carbonate $BaCO_3$ and barium sulfate $BaSO_4$ are present in chemical equilibrium, and the reaction in each direction between $BaCO_3$ and $BaSO_4$ is likely to occur depending upon the atmosphere surrounding the lean NOx catalyst 13. More specifically, as the air-fuel ratio of the exhaust gas is reduced (namely, as the air-fuel ratio becomes richer), barium sulfate $BaSO_4$ is more likely to be dissolved, and barium carbonate $BaCO_3$ is more likely to be produced. To the contrary, as the air-fuel ratio of the exhaust gas is increased (namely, as the air-fuel ratio becomes lean), barium carbonate $BaCO_4$ is more likely to be dissolved, and barium sulfate $BaSO_4$ is more likely to be produced.

In fact, barium sulfate $BaSO_4$ is generally unlikely to be dissolved, and therefore a significant amount of barium sulfate remains undissolved even if the oxygen concentration is reduced (namely, the air-fuel ratio becomes richer). As a result, barium nitrate $Ba(NO_3)_2$ corresponding to the amount of barium used is not produced, and the NOx converting capability of the lean NOx catalyst 13 is decreased or deteriorated, which is called "S poisoning". In view of this problem, the lean NOx catalyst 13 is required to release SOx that has been adsorbed thereon.

Where the fuel or lubricating oil contains a high concentration of sulfur components, the lean NOx catalyst 13 may deteriorate and its NOx conversion efficiency may be significantly decreased before it reaches the target lifetime (for example, about 100,000 km of vehicle running distance). Even in this case, the concentration of NOx released into the atmosphere needs to be controlled not to exceed an allowable value regulated by the law.

In the present embodiment, therefore, the lean burn internal combustion engine is adapted to perform recovery control for releasing adsorbed NOx and thus recovering or resuming the NOx conversion efficiency of the lean NOx catalyst 13 to a desired level when the efficiency is decreased due to adsorption of NOx, and also perform regeneration control for releasing adsorbed SOx and regenerating the lean NOx catalyst 13 when the NOx conversion efficiency is decreased due to adsorption of SOx on the catalyst 13.

Figure 5:
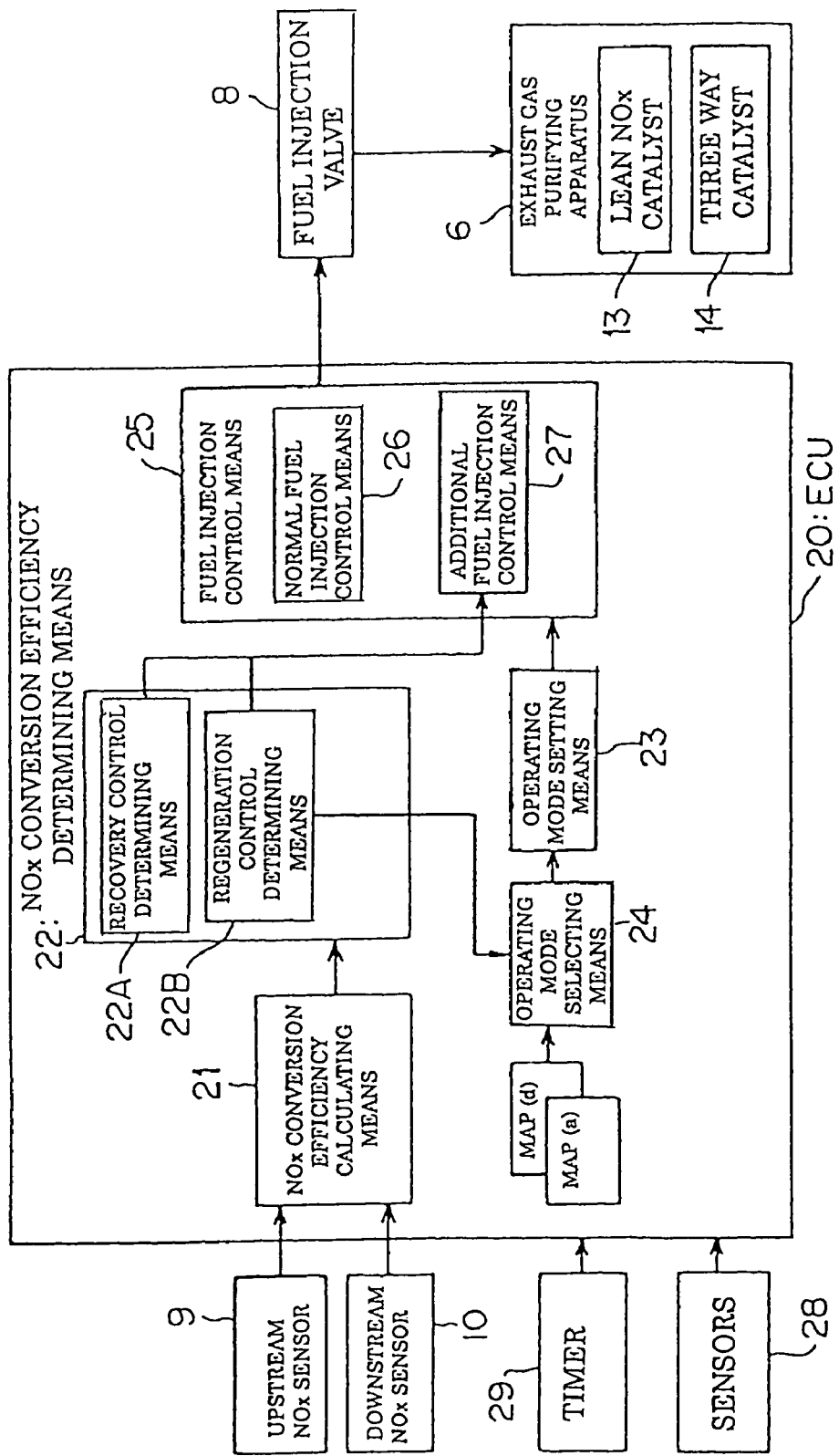
FIG. 5 is a functional block diagram schematically showing principal parts of a control system of the exhaust gas purifying apparatus of the internal combustion engine according to the embodiment of FIG. 1.

To perform the recovery control and regeneration control as described above, the ECU 20 of the lean burn internal combustion engine of the present embodiment is provided with NOx conversion efficiency calculating means 21, NOx conversion efficiency determining means 22, operation mode setting means 23, operation mode selecting means 24, and fuel injection control means 25, as shown in the functional block diagram of FIG. 5.

The NOx conversion efficiency calculating means 21 serves to calculate the efficiency with which the lean NOx catalyst 13 converts or reduce NOx, based on detected information from the upstream NOx sensor 9 and the downstream-side NOx sensor 10. Namely, the NOx conversion efficiency calculating means 21 calculates the NOx conversion efficiency (=A2/A1) of the lean NOx catalyst 13, based on a value A1 detected by the upstream NOx sensor 9, and a value A2 detected by the downstream NOx sensor 10.

The calculation of the NOx conversion efficiency by the NOx conversion efficiency calculating means 21 is performed a certain period of time after the engine operating mode is changed to a lean burn mode, such as an intake lean burn mode or a compression lean burn mode. To this end, the NOx conversion efficiency calculating means 21 is adapted to read a count value of a timer 29, and start calculating when the count value reaches a preset value.

The NOx conversion efficiency determining means 22 determines if there is a need to perform any one of the recovery control for resuming the NOx conversion efficiency of the lean NOx catalyst 13 to the original level when the NOx conversion efficiency is decreased due to adsorption of NOx, and the regeneration control for regenerating the lean NOx catalyst 13 when the NOx conversion efficiency is decreased due to adsorption of SOx on the lean NOx catalyst 13. To this end, the NOx conversion efficiency determining means 22 includes recovery control determining means 22A, and regeneration control determining means 22B.

The recovery control determining means 22A serves to check if a certain period of time (for example, about 60 seconds) has elapsed since the engine starts operating in a lean operation mode, such as an intake lean operation mode or a compression lean operation mode, to determine whether the recovery control needs to be performed or not. To this end, count values of the timer 29 are fed to the recovery control determining means 22A.

When the recovery control determining means 22A determines that the certain period of time (for example, about 60 seconds) has elapsed since the engine starts operating in the lean operation mode, it determines the necessity of the recovery control, and generates an appropriate signal to additional fuel injection control means 27 provided in fuel injection control means 25 as described later.

The regeneration control determining means 22B checks if the NOx conversion efficiency calculated by the NOx conversion efficiency calculating means 21 after the recovery control is smaller than a threshold value "a" for the regeneration control, to determine whether the regeneration control needs to be performed or not.

If the regeneration control determining means 22B determines that the NOx conversion efficiency after the recovery control is less than the threshold value "a", it determines that the regeneration control needs to be performed, and sends an appropriate signal to the additional fuel injection control means 27 provided in the fuel injection control means 25 as described later.

The threshold value "a" for the regeneration control is set to a value of NOx conversion efficiency of the lean NOx catalyst 13 obtained when the concentration of the sulfur component contained in the fuel is 100 PPM, and the running distance has reached about 10,000 km, as shown in FIG. 7.

The fuel injection control means 25 includes normal fuel injection control means 26 and additional fuel injection control means 27.

The additional fuel injection control means 27 controls the operation of the fuel injection valve 8, to perform the recovery control by injecting an additional fuel when the recovery control determining means 22A determines the necessity of the recovery control, and performs the regeneration control by injection an addition fuel when the regeneration control determining means 22B determines the necessity of the regeneration control.

The addition fuel injection control means 27 sets an injection starting time $T_{INJ}$ at which the additional fuel injection is started, based on detected information (for example, engine speed and engine load) received from various sensors 28, and sets a period of time (injection time) during which the additional fuel is injected in each cycle.

The injection starting time $T_{ING}$ and injection time of the additional fuel injection performed, as the recovery control, are set, as shown in FIG. 6(a), so that a fuel-rich atmosphere having a reduced oxygen concentration is produced around the lean NOx catalyst 13.

To provide the rich atmosphere, the air-fuel ratio is set to about 13, and the additional fuel is injected for about 2 seconds. In this case, the timer 29 starts counting once the additional fuel injection as the recovery control is started, and the count value of the time 29 is fed or sent to the additional fuel injection control means 27.

The additional fuel injection, as the recovery control, may also be called "rich spike" or "rich pulse" since the control intends to temporarily produce a rich atmosphere around the lean NOx catalyst 13.

The recovery control is performed for the following reason. When the engine operates in the intake lean burn mode or compression lean burn mode, an oxygen excessive atmosphere (lean atmosphere) is produced around the lean NOx catalyst 13, and the reaction as indicated by the formula (1) takes place. If the engine continues to operate in the lean operation mode for a certain period of time (for example, about 60 seconds) or longer, a large quantity of NOx is adsorbed on the lean NOx catalyst 13, and the NOx conversion efficiency of the lean NOx catalyst 13 is gradually decreased.

To deal with the increase in the amount of adsorbed NOx on the lean NOx catalyst 13 and the reduction in the NOx conversion efficiency, the additional fuel injection control means 27 performs recovery control by injecting an additional fuel into the combustion chamber, to encourage the reaction as indicated in the above-indicated formula (2), thereby to release NOx from the lean NOx catalyst 13. As a result, the NOx conversion efficiency of the lean NOx catalyst 13 can be improved, as shown in FIG. 6(b). It is to be noted that FIG. 6(b) is an enlarged view of a portion denoted by X in FIG. 7.

Since the amount of ceria ($CeO_2$) added to the light-off catalyst 11 is reduced in the present embodiment, CO that is to be supplied to the lean NOx catalyst 13 under the recovery control is prevented from being oxidized and consumed by $O_2$ stored in ceria ($CeO_2$) contained in the light-off catalyst 11, and therefore the NOx adsorbed on the lean NOx catalyst 13 can be surely released, thus assuring high durability of the catalyst 13.

Next, the injection starting time $T_{INJ}$ and the injection time in the additional fuel injection performed as the regeneration control are respectively determined so that a rich atmosphere (for example, A/F is equal to about 12) having a reduced oxygen concentration and a certain temperature (for example, about 600° C. or higher) is produced around the lean NOx catalyst 13. The additional fuel injection, as the recovery control, is conducted for a predetermined period of time (for example, about 3 minutes).

More specifically, the injection starting time $T_{INJ}$ is set so that the additional fuel injection control means 27 performs additional fuel injection as the regeneration control during a period between the middle period of the expansion stroke of each cylinder and the later period of the exhaust stroke, that is, in a heat remaining period in which the heat generated by main combustion due to normal fuel injection still remains in the combustion chamber.

The injection starting time $T_{INJ}$ is set in the above manner, because the fuel that is additionally injected into the combustion chamber should be burned (or re-burned) without fail, so that a rich atmosphere having a reduced oxygen concentration and a high temperature (for example, about 600° C.) is produced around the lean NOx catalyst 13, to release SOx adsorbed on the lean NOx catalyst 13.

More specifically, the additional fuel injection control means 27 sets the injection starting time $T_{ING}$ by correcting a basic fuel injection starting time $Tb_{ING}$ based on which the additional fuel is injected in the later period of the expansion stroke or later, depending upon the coolant temperature W, EGR amount, and the ignition timing $T_{IG}$ for main combustion.

The additional fuel injection control means 27 also sets the injector driving time or period $t_{PLUS}$, by correcting the basic driving time tB based on which the additional fuel is injected during or after the expansion stroke, depending upon the injection start time $T_{ING}$, and catalyst temperature C.C.

The regeneration control, as described above, is performed for the following reason. Even if the rich pulse, or recovery control of the lean NOx catalyst 13 is performed at certain time intervals (for example, about 60 seconds), the reaction as indicated by the above-indicated formula (3) also occurs on the lean NOx catalyst 13 when it is surrounded by an oxygen excessive atmosphere (lean atmosphere), and therefore SOx is gradually adsorbed onto the lean NOx catalyst 13, with a result of adsorption of barium sulfate $BaSO_4$ on the lean NOx catalyst 13. Even when the oxygen concentration around the lean NOx catalyst 13 is reduced (the exhaust air-fuel ratio becomes richer), the barium sulfate $BaSO_4$ is not dissolved, but kept being adsorbed on the lean NOx catalyst 13. Consequently, barium nitrate $Ba(NO_3)_2$ corresponding to the amount of barium Ba used for adsorbing SOx is no longer produced, and the NOx conversion capability of the lean NOx catalyst is decreased.

To measure the predetermined period of time during which the regeneration control is performed, the timer 29 starts counting when the additional fuel injection control, as regeneration control, is started, and the count value of the timer 29 is continuously fed to the additional fuel injection control means 25.

In the above arrangement, where the NOx conversion efficiency is decreased with an increase in the amount of SOx adsorbed on the lean NOx catalyst 13, the reaction as indicated in the above formula (4) is accelerated due to the additional fuel injection control, as the regeneration control, thereby enabling SOx to be released from the lean NOx catalyst 13, and consequently the NOx conversion efficiency of the lean NOx catalyst 13 can be improved as shown in FIG. 7.

In FIG. 7, the solid line A indicates the NOx conversion efficiency after the recovery control, and the solid line B indicates the NOx conversion efficiency after the regeneration control.

Since the amount of ceria ($CeO_2$) contained in the light-off catalyst 11 is reduced in the present embodiment, CO, that is to be supplied to the lean NOx catalyst 13 under the regeneration control, is prevented from being oxidized and consumed by $O_2$ stored in ceria ($CeO_2$) of the light-off catalyst 11, and therefore the SOx adsorbed on the lean NOx catalyst 13 an be surely released, thus assuring high durability of the catalyst 13.

Figure 8:
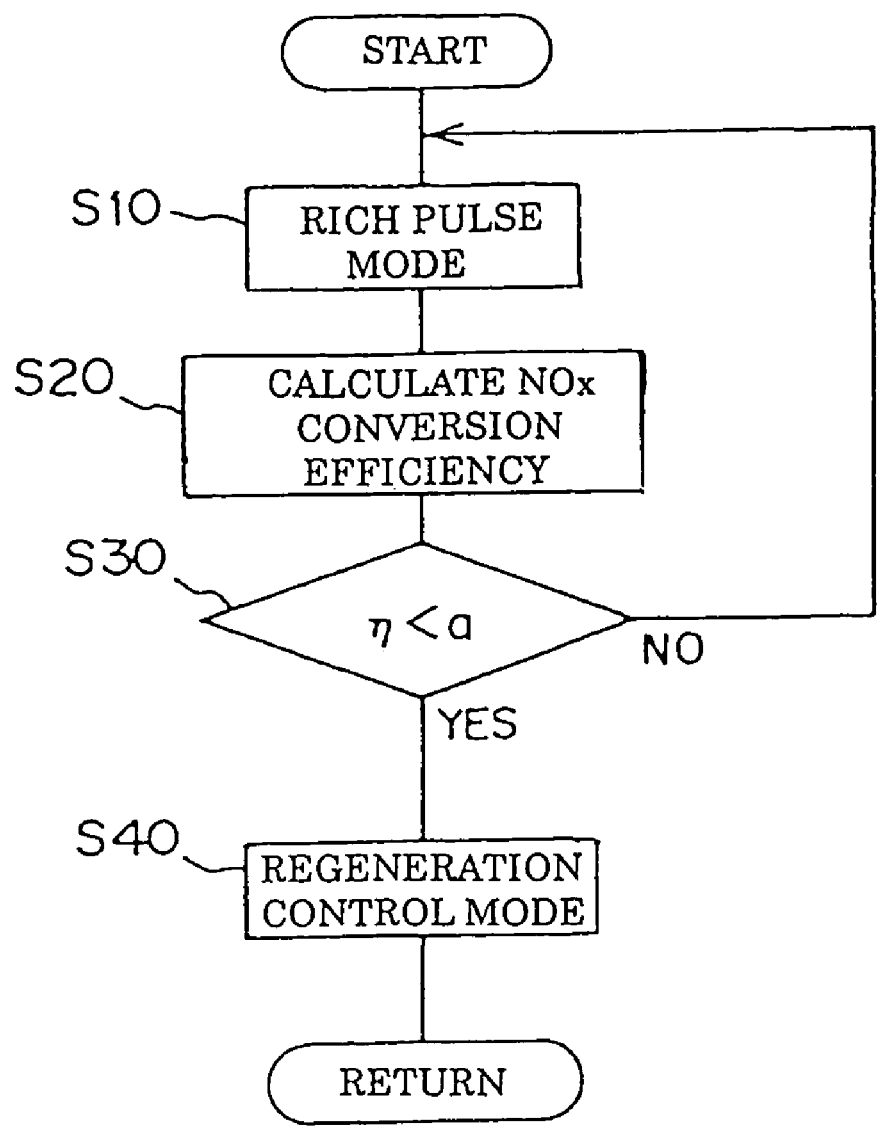
FIG. 8 is a flowchart showing the recovery control, regeneration control, and control for narrowing a lean burn operation region, in the exhaust gas purifying apparatus of the internal combustion engine according to the embodiment of FIG. 1.

With the lean combustion engine of the present embodiment constructed as described above, the recovery control and regeneration control are performed by executing a control routine as shown in the flowchart of FIG. 8.

Initially, step S10 is executed to operate the engine in the recovery control mode. In the recovery control mode, the following processing is performed, though details of the control are not shown in FIG. 8.

The amount of NOx adsorbed on the lean NOx catalyst 13 gradually increases as the engine operates in the compression lean operation mode or intake lean operation mode. In order to recover or resume the NOx conversion efficiency of the lean NOx catalyst 13 to a desired level, therefore, it is determined whether the recovery control needs to be performed to release the adsorbed NOx from the lean NOx catalyst 13.

The recovery control determining means 22A judges the necessity of the recovery control, by determining whether the operation of the engine in the intake lean operation mode or compression lean operation mode has lasted for a certain period of time (for example, about 60 seconds) or not. If it is determined from the result of the above judgement that the recovery control needs to be performed, the additional fuel injection control means 27 controls the fuel injector 8 to inject an additional fuel (or generate a rich pulse), to thus perform the recovery control.

Due to the additional fuel injection, a rich atmosphere having a small air-fuel ratio is produced around the lean NOx catalyst 13, and NOx that has been adsorbed on the lean NOx catalyst 13 is released, with a result of an improved NOx conversion efficiency of the catalyst 13.

In this case, since the light-off catalyst 11 contains a small or zero amount of ceria ($CeO_2$) in the present embodiment, CO supplied under the recovery control is prevented from being oxidized and consumed by $O_2$ stored in the ceria ($CeO_2$) of the light-off catalyst 11, and can be used for releasing the adsorbed NOx from the lean NOx catalyst 13.

Although the recovery control as described above is performed at given time intervals (for example, about 60 seconds), to release the adsorbed NOx from the catalyst, the amount of SOx that is also adsorbed on the lean NOx catalyst 13 gradually increases since the adsorbed SOx cannot be released by the above-described recovery control. Consequently, the NOx conversion efficiency of the lean NOx catalyst 13 is deteriorated by the time when the vehicle running distance reaches, for example, about 10,000 km.

In step S20, the NOx conversion efficiency calculating means 21 calculates the NOx conversion efficiency η of the lean NOx catalyst 13 after the recovery control is performed. In step S30, the regeneration control determining means 22B determines whether or not the NOx conversion efficiency η, after the recovery control, is less than the threshold value "a" for judging the necessity of the regeneration control.

If it is determined that the NOx conversion efficiency η, after the recovery control, is equal to or greater than the threshold value "a", the control flow returns to S10 since the regeneration control has not been required to be performed. Thus, the processing of step S10 to step S30 is repeated until the NOx conversion efficiency η, calculated after the recovery control, becomes less than the threshold value "a" for the regeneration control.

When the NOx conversion efficiency 1, after the recovery control, is judged as being less than the regeneration control threshold value "a", it is considered that the NOx conversion efficiency has been reduced due to adsorption of SOx on the lean NOx catalyst 13, and the regeneration control needs to be performed. In this case, the control flow goes to step S40, and the engine is operated in the regeneration control mode. In the regeneration control mode, the additional fuel injection control means 27 controls the injector 8 to inject an additional fuel to regenerate the lean NOx catalyst 13.

As a result of the additional fuel injection, a rich atmosphere having a small air-fuel ratio and a certain temperature (about 600° C. or higher) is produced around the lean NOx catalyst 13, so that SOx adsorbed on the lean NOx catalyst 13 is released, thus assuring an improved NOx conversion efficiency of the lean NOx catalyst 13.

In the present embodiment, CO supplied by the regeneration control is prevented from being oxidized and consumed by $O_2$ stored in ceria ($CeO_2$) of the light-off catalyst 11, and therefore the adsorbed SOx can be surely released from the lean NOx catalyst 13.

The above-described control routine including step S10 through step S40 is repeated.

The exhaust gas purifying apparatus of the internal combustion engine according to one embodiment of the invention is constructed as described above, and thus provides the functions and effects as described below.

In the present exhaust gas purifying apparatus of the engine, the light-off catalyst 11 provided immediately downstream of the engine serves to reduce HC in the exhaust gas while the engine is operating in the cold state.

When the engine that has warmed up is operating in the stoichiometric feedback operation mode, the light-off catalyst 11 and the three-way catalyst 14 serve to reduce HC, CO, and NOx in the exhaust gas. When the engine that has warmed up is operating in the lean operation mode, the light-off catalyst 11 and three-way catalyst 14 cannot reduce NOx by utilizing their purifying characteristics, but the lean NOx catalyst 13 adsorbs NOx in the exhaust gas, and prevents the NOx from being discharged into the atmosphere.

Since there is a limit to the amount of NOx that can be adsorbed on the lean NOx catalyst 13, the recovery control is performed (a rich pulse is generated) when the NOx conversion efficiency is reduced. In the recovery control, an atmosphere having a reduced oxygen concentration is produced around the lean NOx catalyst 13, and NOx that has been adsorbed on the lean NOx catalyst 13 is released, to resume the NOx conversion efficiency to the desired level.

Most of NOx released from the lean NOx catalyst 13 during the recovery control is converted into a harmless substance by the three-way catalyst 14 located downstream of the catalyst 13.

Since the light-off catalyst 11 of the present embodiment contains only a small amount or none of ceria ($CeO_2$), CO that is supplied under the recovery control is prevented from being oxidized by $O_2$ stored in ceria ($CeO_2$) of the light-off catalyst 11. Accordingly, the NOx adsorbed on the lean NOx catalyst 13 can be surely released from the catalyst 13, and the NOx conversion efficiency is resumed to the desired level.

Where the NOx conversion efficiency is decreased due to adsorption of SOx on the lean NOx catalyst 13, the regeneration control is performed, in which an atmosphere having a reduced oxygen concentration is produced around the lean NOx catalyst 13, so that the adsorbed SOx is released from the lean NOx catalyst 13. Thus, the lean NOx catalyst 13 is regenerated, to thus provide an improved NOx conversion efficiency.

In this case, since the light-off catalyst 11 of the present embodiment contains a small amount or none of ceria ($CeO_2$), CO that is supplied under the regeneration control is prevented from being oxidized by $O_2$ stored in ceria ($CeO_2$) of the light-off catalyst 11. Accordingly, the SOx adsorbed on the lean NOx catalyst 13 can be surely released from the catalyst 13, and the lean NOx catalyst 13 can be thus regenerated.

As described above, in the present exhaust gas purifying apparatus of the internal combustion engine, the light-off catalyst 11 provided in the exhaust passage on the upstream side of the NOx catalyst is able to reduce a sufficient amount of HC in the exhaust gas while the engine starts operating in the cold state. Also, when the NOx purifying efficiency is decreased due to adsorption of NOx or SOx on the lean NOx catalyst 13, the adsorbed NOx or SOx can be surely released from the lean NOx catalyst 13, to ensure improved durability of the catalyst 13, since the light-off catalyst 11 contains only a small amount or none of ceria ($CeO_2$), and has a low $O_2$ storage capability.

In the exhaust purifying apparatus of the internal combustion engine according to the illustrated embodiment, the exhaust gas purifying means is constructed such that the three-way catalyst 14 is provided as a separate component located downstream of the lean NOx catalyst 13. It is, however, possible to provide a single catalyst that has both the function of the lean NOx catalyst and the function of the three-way catalyst. In this case, the $O_2$ storage ability of the light-off catalyst 11 may be set to be lower than that of the single catalyst.

In the exhaust gas purifying apparatus of the illustrated embodiment, when the lean NOx catalyst 13 suffers from S poisoning, the engine operation may be controlled using a narrowed or reduced lean burn operation region, and the function of the three-way catalyst 14, as well as that of the lean NOx catalyst 13, may be effectively utilized to avoid an increase in the NOx component in the exhaust gas. The lifetime of the lean NOx catalyst 13 can be extended or prolonged, and the increase of the NOx component in the exhaust gas can be avoided, only by narrowing the lean burn operation region in the control of the engine operation.

In the exhaust gas purifying apparatus of the illustrated embodiment, the recovery control is performed by injecting an additional fuel under control of the additional fuel injection control means 27 to produce a rich atmosphere around the lean NOx catalyst 13. However, the method of producing the rich atmosphere around the lean NOx catalyst 13 as the recovery control is not limited to this, but any other method may be employed. For example, the operating mode of the engine may be changed to the rich burn mode.

In the exhaust gas purifying apparatus of the illustrated embodiment, the regeneration control is performed by injecting an additional fuel is injected under control of the additional fuel injection control means 27, to produce a rich atmosphere around the lean NOx catalyst 13, and increase the exhaust gas temperature. However, the method of producing the rich atmosphere and increasing the exhaust gas temperature is not limited to this, but any other method may be employed. For example, the engine may operate with a fuel-rich mixture, or the ignition timing may be retarded or delayed, or other device (such as electric heating catalyst) may be used.

In the exhaust gas purifying apparatus of the illustrated embodiment, the NOx sensors are provided on the upstream and downstream sides of the lean NOx catalyst 13, for the purpose of calculating the NOx conversion efficiency of the lean NOx catalyst 13. The present invention, however, is not limited to this arrangement, but only one NOx sensor may be provided downstream of the lean NOx catalyst 13, for detecting the amount of the NOx in the exhaust gas emitted from the exhaust purifying device 6. In this case, the amount of NOx in the exhaust gas that is supplied to the exhaust purifying device 6 may be obtained from a preset NOx amount stored in the ECU according to the engine operating conditions, and deterioration of the lean NOx catalyst 13 may be estimated by comparing the detected value of the NOx sensor and the value stored in the ECU.

While the exhaust gas purifying apparatus of the illustrated embodiment is used with the in-cylinder injection type internal combustion engine, the present invention may also be applied to other type of engine, provided that the engine is capable of operating in a lean burn mode.

In the exhaust gas purifying device 6 of the illustrated embodiment, the regeneration control is performed for releasing SOx adsorbed on the lean NOx catalyst 13, thereby to prevent the lean NOx catalyst 13 from being poisoned by the sulfur component in the exhaust gas (S poisoning). However, the method of preventing the S poisoning of the lean NOx catalyst 13 is not limited to this, but the following method may be employed.

An SOx catalyst (S-Trap) 12 that adsorbs the sulfur component (SOx) in the exhaust gas may be disposed upstream of the lean NOx catalyst 13 in the exhaust passage 3, as indicated by two-dot chain line in FIG. 1, in order to prevent S poisoning of the lean NOx catalyst 13.

The SOx catalyst 12, which serves to reduce SOx in the exhaust gas by adsorbing SOx thereon, includes a substrate or support made of alumina $Al_2O_3$, and a metal component M', such as strontium (Sr), as an adsorbent, and platinum (Pt) as an active metal, which are supported by the alumina substrate. While alumina ($Al_2O_3$) is used for forming the substrate or support in the SOx catalyst 6B of this example, a substrate made of other material, such as zirconia ($ZrO_2$), may also be used.

The metal component M' supported by the SOx catalyst 6B functions to adsorb SOx in the exhaust gas under an oxygen excessive atmosphere, and release the adsorbed SOx when the oxygen concentration is reduced. Further, the metal component M' hardly adsorbs NOx when the air-fuel ratio of the exhaust gas is lean, namely, when the oxygen concentration is increased. For example, the metal component M' is selected from strontium (Sr), potassium (Ca), zinc (Zn), and manganese (Mn).

Since there is a limit to the amount of SOx adsorbed on the SOx catalyst 12, as in the case of the NOx catalyst, an additional fuel may be injected into the combustion chamber to produce a rich atmosphere having a reduced oxygen concentration, around the SOx catalyst 12, so that the adsorbed SOx is released from the SOx catalyst 12, thus preventing a reduction in the SOx conversion ability of the SOx catalyst 12. In this case, since the light-off catalyst has a low $O_2$ storage ability, CO contained in the exhaust gas is not oxidized by the light-off catalyst, and is thus able to release SOx from the catalyst, without affecting the fuel economy.

While the SOx catalyst 12 adsorbs SOx in the exhaust gas, but does not adsorb NOx in the exhaust gas, NOx that is not adsorbed on the strontium catalyst is adsorbed by the lean NOx catalyst 13 located downstream of the SOx catalyst 12.

While the SOx catalyst 12 is provided downstream of the light-off catalyst 11 in the exhaust passage 3, as a separate member from the light-off catalyst 11, a single catalyst may be provided which has both the three-way function of the light-off catalyst and the function of the SOx catalyst. In this case, since the light-off catalyst 11 contains only a small amount of ceria ($CeO_2$), $SO_2$ trapped by this catalyst is prevented from reacting with $O_2$ stored in the ceria ($CeO_2$) to provide $SO_3$, which would be in turn adsorbed by the lean NOx catalyst 13.

In addition to providing the SOx catalyst 12 as described above, the regeneration control may also be performed to release SOx adsorbed on the lean NOx catalyst 13.

As described above in detail, in the exhaust gas purifying apparatus of the present invention, the light-off catalyst located upstream of the exhaust gas purifying means in the exhaust passage is able to certainly reduce HC in the exhaust gas when the engine starts operation in a cold state, for example.

On the other hand, the light-off catalyst has a low $O_2$ storage ability, and is therefore able to allow CO to pass therethrough without oxidizing it, thereby to ensure a sufficient amount of CO for releasing NOx or SOx from the exhaust gas purifying means, without decreasing the fuel efficiency.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An exhaust gas purifying apparatus of an internal combustion engine, comprising:
 a light-off catalyst provided in an exhaust passage and having an $O_2$ storage capability such that said light-off catalyst passes, there through, at least CO in an exhaust gas to a downstream side of said light-off catalyst when the internal combustion engine is operating under a condition where the oxygen concentration of the exhaust gas is reduced;

exhaust gas purifying means provided in the exhaust passage at a downstream position of and in series with said light-off catalyst, said exhaust gas purifying means having a NOx catalyst for adsorbing NOx in the exhaust gas when an air-fuel ratio of the exhaust gas is lean and releasing the adsorbed NOx when the oxygen concentration of the exhaust gas is reduced, said exhaust gas purifying means further having a three-way catalyst that reacts with the released NOx;

wherein the light-off catalyst has an oxygen storage capability of a first value and the three-way catalyst of the exhaust gas purifying means has an oxygen storage capability of a second value greater than said first value, said first and second values being per one liter of catalyst; and NOx regeneration control means for repeatedly releasing NOx adsorbed by the NOx catalyst every first interval outside the temperature range where SOx is releasable, and separate SOx regeneration control means independent from said NOx regeneration control means for repeatedly releasing SOx adsorbed by the NOx catalyst every second interval, said second interval being longer than the first interval and determined independently from said first interval.

2. The exhaust gas purifying apparatus as defined in claim 1, wherein said condition where the oxygen concentration of the exhaust gas is reduced includes at least one of a stoichiometric operating condition and a fuel rich operating condition.

3. An exhaust gas purifying apparatus as defined in claim 1, wherein said light-off catalyst mainly purifies HC in an exhaust gas emitted from the engine in a cold state.

4. An exhaust gas purifying apparatus as defined in claim 1, wherein said light-off catalyst is provided in the exhaust passage immediately downstream of the internal combustion engine.

5. An exhaust gas purifying apparatus as claimed in claim 1, comprising control means for recovering the NOx catalyst by reducing the oxygen concentration in the exhaust gas such that said CO that has passed through said light-off catalyst is introduced to said NOx catalyst when a NOx conversion efficiency of the NOx catalyst is decreased and maintaining the reduced oxygen concentration until the absorbed NOx in said NOx catalyst is released outside the temperature range where SOx is releasable, calculating the NOx conversion efficiency after the recovery, and regenerating the NOx catalyst to release SOx only when the NOx conversion efficiency, calculated after the recovery, is less than a threshold value.

6. The exhaust gas purifying apparatus as defined in claim 1, wherein an amount of oxygen adsorbed on said light-off catalyst is not greater than about 150 cc per one-liter volume of the catalyst when measured by an oxygen pulse method.

7. The exhaust gas purifying apparatus as defined in claim 6, wherein an oxygen component stored in said light-off catalyst is not greater than about 25 g per one-liter volume of the catalyst.

8. The exhaust gas purifying apparatus as defined in claim 1, wherein an amount of oxygen adsorbed on the three-way catalyst of said exhaust gas purifying means is not greater than about 150 cc per one-liter volume of the catalyst when measured by an oxygen pulse method.

9. The exhaust gas purifying apparatus as defined in claim 8, wherein an oxygen component stored in the three-way catalyst of said exhaust gas purifying means is not greater than about 25 g per one-liter volume of the catalyst.

10. The exhaust gas purifying apparatus as defined in claim 1, wherein the internal combustion engine is a spark ignition type four-cycle engine that operates on the four-stroke cycle consisting of a suction stroke, compression stroke, combustion/expansion stroke, and exhaust stroke.

11. The exhaust gas purifying apparatus as defined in claim 10, wherein the internal combustion engine is an in-cylinder injection type engine in which fuel is directly injected into a combustion chamber.

12. The exhaust gas purifying apparatus as defined in claim 1, wherein the exhaust gas purifying means is a single catalyst.

13. The exhaust gas purifying apparatus as defined in claim 12, wherein the single catalyst of the exhaust gas purifying means includes a function of the three-way catalyst.

14. The exhaust gas purifying apparatus as defined in claim 12, wherein the light-off catalyst includes a single catalyst that functions as the three-way catalyst.

15. The exhaust gas purifying apparatus as defined in claim 14, wherein the exhaust gas purifying means further functions also as the NOx catalyst.

16. The exhaust gas purifying apparatus as defined in claim 15, wherein the light off catalyst functions also as an SOx catalyst.

17. An exhaust gas purifying apparatus as defined in claim 1, wherein said light-off catalyst has a reduced $O_2$ storage capability per one liter volume of the catalyst.

18. An exhaust gas purifying apparatus as defined in claim 17, wherein said light-off catalyst includes a three-way catalyst.

19. An exhaust gas purifying apparatus as defined in claim 17, wherein said light-off catalyst includes an oxidizing catalyst.

20. An exhaust gas purifying apparatus as defined in claim 17, wherein said control means sets the air-fuel ratio leaner as compared to an air-fuel ratio required to release the adsorbed NOx from the NOx catalyst when the NOx catalyst is used in conjunction with a three-way catalyst in which the $O_2$ storage capability is not reduced.

* * * * *